Oct. 14, 1969   E. WEINBRENNER ET AL   3,472,715
PROCESS FOR THE MANUFACTURE OF PNEUMATIC TIRES
Filed Feb. 21, 1967   2 Sheets-Sheet 1

ERWIN WEINBRENNER
ULRICH KNIPP
INVENTOR.

BY Burgess, Dinklage &
Sprung
ATTORNEYS

ERWIN WEINBRENNER
ULRICH KNIPP   INVENTOR.

United States Patent Office

3,472,715
Patented Oct. 14, 1969

---

3,472,715
PROCESS FOR THE MANUFACTURE OF PNEUMATIC TIRES
Erwin Weinbrenner, Opladen, and Ulrich Knipp, Leverkusen, Germany, assignors to Farbenfabriken Bayer Aktiengesellschaft, Leverkusen, Germany, a corporation of Germany
Continuation-in-part of application Ser. No. 491,293, Sept. 29, 1965. This application Feb. 21, 1967, Ser. No. 625,892
Claims priority, application Germany, Oct. 10, 1964, F 44,194
Int. Cl. B29h 3/14, 17/00
U.S. Cl. 156—125     4 Claims

---

ABSTRACT OF THE DISCLOSURE

Process for forming a pneumatic tire, including molding two separate and complete tire halves of polyurethane polymer containing fibers therein and then circumferentially joining these tire halves.

---

Figure 1:
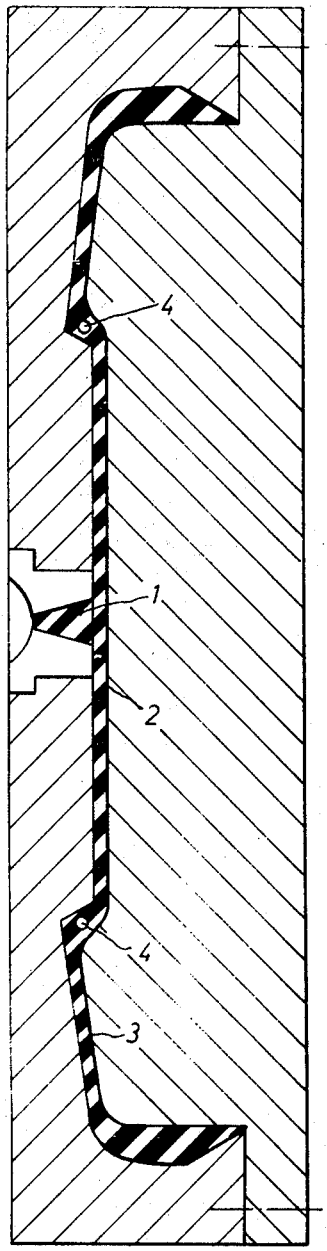

This application is a continuation-in-part of application Ser. No. 491,293, filed Sept. 29, 1965, now abandoned.

The present invention relates to a process for the manufacture of pneumatic tires.

This specification describes a new process for producing pneumatic tires by molding complete tire halves of a thermoplastic material comprising a polyurethane and then joining the two tire halves by welding or gluing, as appropriate.

As is known, pneumatic tires for vehicles are built up by producing combinations of rubber and textile or of rubber and steel cord in expensive and time-consuming operations and then vulcanizing the prefinished body of the tire in suitable molds. It has also been proposed to produce tires from elastomeric synthetic resins, for example, based on soft polyvinyl chloride, on polyurethane elastomers or on acrylic acid esters instead of materials made of rubber and textile fabrics. The purpose of this was mainly to produce the body of the tire by a centrifugal casting process instead of a pressure molding process. It was found, however, that the centrifugal process was rather expensive. The core that is necessary in molds for tires must be assembled from various steel parts and must be absolutely impervious. These are conditions which make mass production more difficult. On the other hand, it was found that elastomers which were not filled began to flow after a time under the air in the tire so that it was not possible to keep the external dimensions of the tire constant. Attempts have also been made to incorporate textile reinforcements in the body of tires made by the centrifugal process. Unfortunately, however, this could not be achieved satisfactorily owing to poor fixation of the textile.

The problem thus arose of manufacturing bodies of tires by a simple method and at the same time preparing the tire in such a manner as to produce the effect achieved in the conventional tires by rubber textile reinforcements, namely, to keep the dimensions of the tire constant under internal air pressure.

According to the present invention, it is possible to manufacture pneumatic tires by making two separate halves of the body of the tire, separated in the circumferential direction, from fiber-filled elastomers by means of the injection molding process and subsequently joining the two halves.

Suitable elastomers for the process of this invention are those based upon natural and synthetic rubber and upon polyurethane elastomers, especially those based on thermoplastic polyurethane elastomers. Polyurethane elastomeric thermopolymers particularly suited for use in this invention are exemplified by the polymerization products of at least one polyisocyanate or isothiocyanate such as 4,4'-diphenylmethane diisocyanate, hexamethylene diisocyanate, 1,5'-naphthylene diisocyanate, tolylene diisocyanate, 1,4-phenylene diisocyanate, and their sulfur analogues and at least one active hydrogen-containing compound such as polyesters, polyethers, polyethioethers and polyester amide. The reaction of active hydrogen-containing compounds and polyisocyanates is suitably catalyzed by the application of high temperatures, triethylamine, triethyl diamine, dibutyl tin dilaurate and iron acetyl acetonate. Suitable cross-linking agents include amines and glycols such as ethylene glycol, butylene glycol, hexanediol and $\beta,\beta'$-hydroquinone dioxethylether. Suitable fibers for the reinforcement of such elastomers include both organic and inorganic fibers. Especially suitable are fibers of polyterephthalic acid esters, polyamides, linear polyurethanes, polyacrylonitrile and cellulose. Of the inorganic fibers, it is advantageous to use glass fibers. The length of the fibers should generally be from 0.1 to 3 mm. The fiber content is advantageously from 10 to 40 percent, calculated on 100 percent by weight of elastomers. With rubber elastomers, the two halves of the tire are joined together by gluing in a conventional apparatus. If, however, the two halves are made of synthetic resin, they may also be joined by gluing, or, alternatively, they can be joined by welding by means of hot gas, heating elements, heating wedges, thermal impulses, compression butt welding, friction or dieletcric welding. According to this invention, the two parts may also be joined together by clamps or by the formation of suitable interlocking recesses.

FIGURE 1 is a section of a tire subdivided in the circumferential direction and lying in an injection mold. The tire half 3 is injected from a stalk sprue 1 and a suitable number of gates or from an umbrella sprue 2. As in conventional tires, it is advantageous to provide a steel ring 4 in the casting of the tire. When the injection molded tire half has been removed from the mold, the sprue is removed and two such tire halves are joined together as described above, for example, by friction welding.

Figure 2:
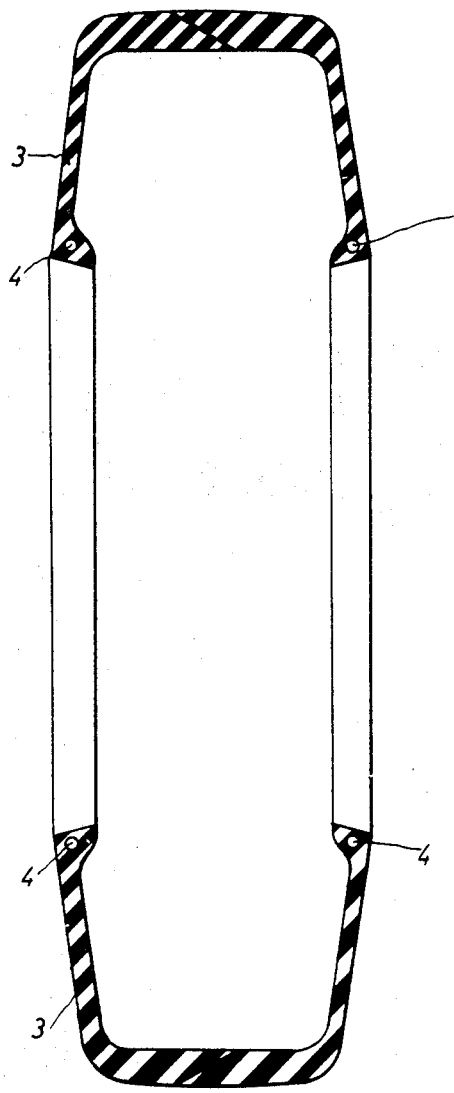

FIGURE 2 shows a section through such an assembled tire body. According to this invention, it is also possible to form the body of a tire from two halves by the process described and then to mount a replaceable girth ring of natural or synthetic rubber or synthetic resin on this body in a manner already previously described.

In the manufacture of large heavy tires where the application of the injection molding process is not suitable, thermoplastic elastomers filled with organic or inorganic fibers, preferably thermoplastic elastomers containing urethane groups, are introduced into the molds of the two halves of the tire body by casting and the molded halves of the tire body are joined by welding.

Figure 3:
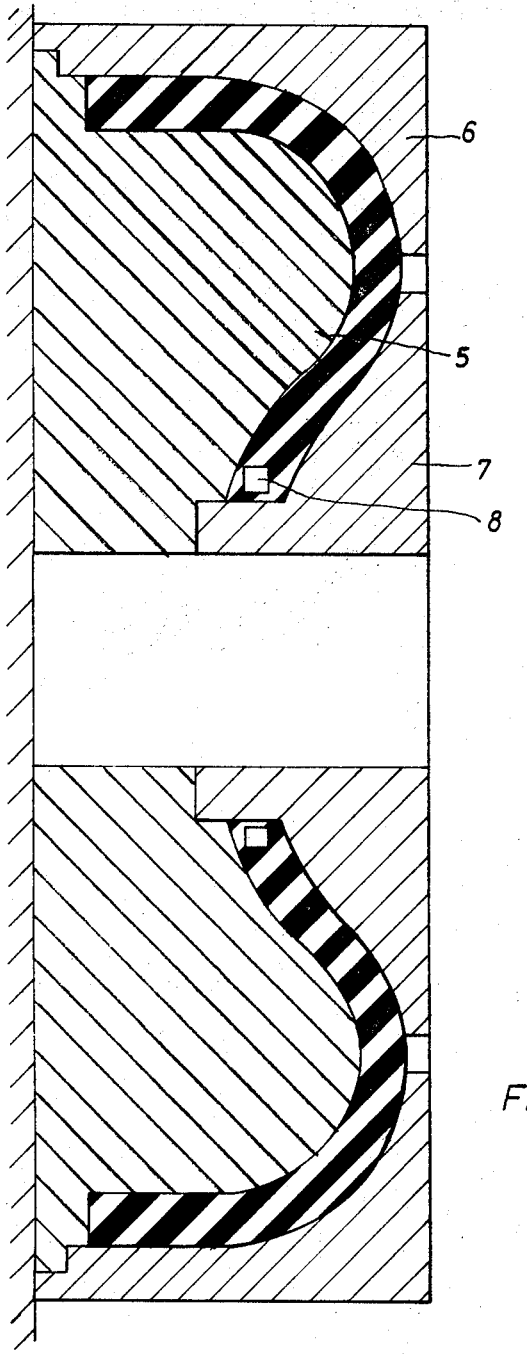
Figure 3:
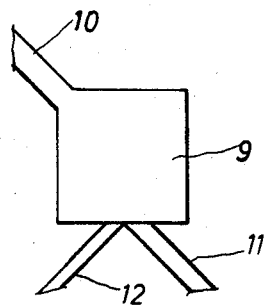

FIGURE 3 shows an arrangement for the manufacture of halves of a tire body by casting.

The mold consists of the molding elements 5, 6 and 7 which are equipped with heating means. The annular bead 8 is provided in the cavity formed by the molding elements 5, 6 and 7.

The molten reaction mixture containing fibers is introduced into the cavity formed by the molding elements 5, 6 and 7 in appropriate quantities by means of a commercial metering device (not shown in the drawing) and the mixer head 9 which is equipped with the outlet means 10. Reference numerals 11 and 12 are the feed pipes for the components. After solidification, one half of the tire body is removed and joined with the other half, for instance, by friction welding.

The following example is set forth as illustrative of the instant invention without in any manner limiting spirit and scope thereof.

EXAMPLE

Two half-tires are molded in an injection mold from thermoplastic polyurethane elastomers. The thermoplastic polyurethane elastomer which is present in granulate form and contains 20 percent short glass fibers (length: 0.1–0.3 mm.; diameter 6μ) is of an 84 Shore A hardness. The two tire halves are placed in a friction welding device. The friction welding conditions are as follows: 2 mm. initial tension; 10 m./sec. peripheral-, i.e., friction velocity; friction time: 15 seconds. After additional 15 seconds, the finished tire can be removed. The tire is stored at 100° C. for about 7 hours.

What is claimed is:

1. Process for the manufacture of pneumatic tires which comprises molding two separate and complete tire halves of a polyurethane polymer, each of which halves has fibers therein, and then joining said halves in a circumferential direction to produce a complete tire.

2. Process as claimed in claim 1, wherein the fiber-filled masses contain fibers of a length between 0.1 and 3 mm.

3. Process as claimed in claim 1, wherein said tire halves are joined by circumferential welding.

4. Process as claimed in claim 3, wherein said welding is friction welding.

References Cited

UNITED STATES PATENTS

| | | |
|---|---|---|
| 2,877,501 | 3/1959 | Bradt. |
| 2,968,575 | 1/1961 | Mallonee. |
| 3,097,192 | 7/1963 | Schilit. |
| 2,925,623 | 2/1960 | Beckadolph _____ 264—277 |
| 3,061,497 | 10/1962 | Wilson. |
| 2,497,226 | 2/1950 | McNeil _____ 264—326 |
| 3,224,916 | 12/1965 | Soloff _____ 264—23 |

HAROLD ANSHER, Primary Examiner

U.S. Cl. X.R.

156—245, 304; 264—248, 250, 326, 328